H. A. McCALLUM.
VIEW FINDER FOR CAMERAS.
APPLICATION FILED JUNE 28, 1918.
1,340,619.
Patented May 18, 1920.
3 SHEETS—SHEET 1.
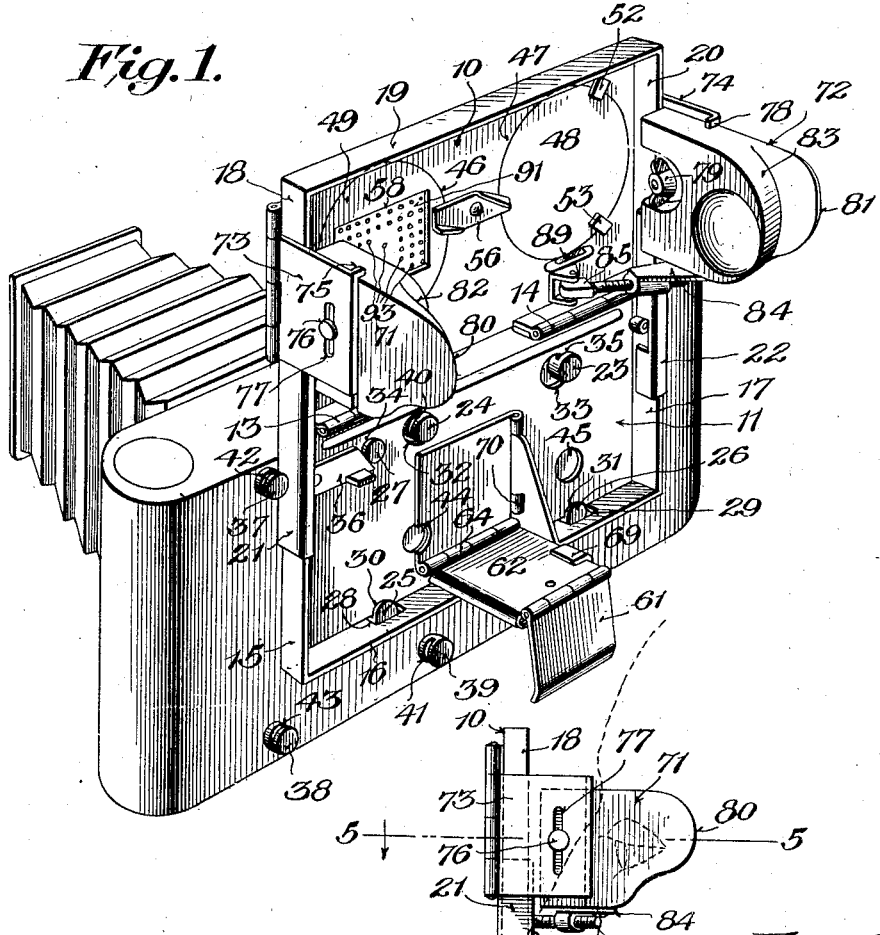

H. A. McCALLUM.
VIEW FINDER FOR CAMERAS.
APPLICATION FILED JUNE 28, 1918.
1,340,619.
Patented May 18, 1920.
3 SHEETS—SHEET 2.
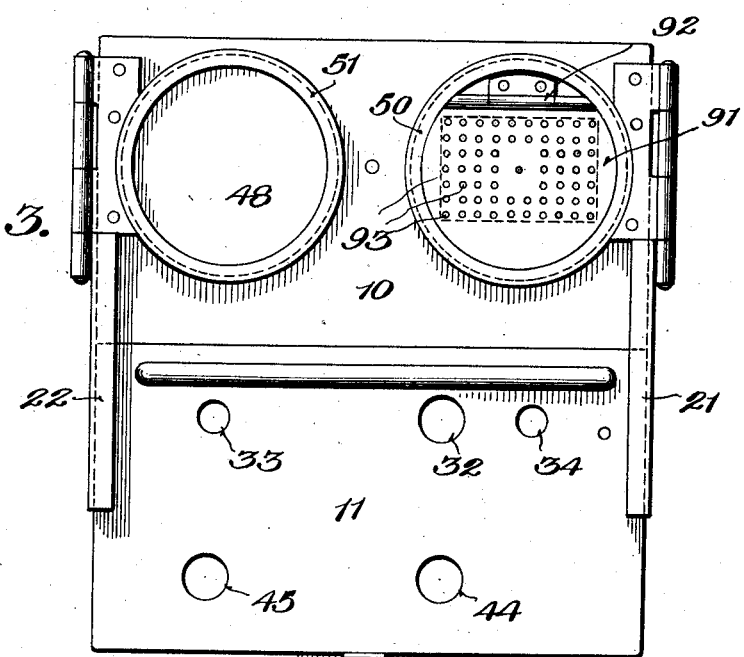
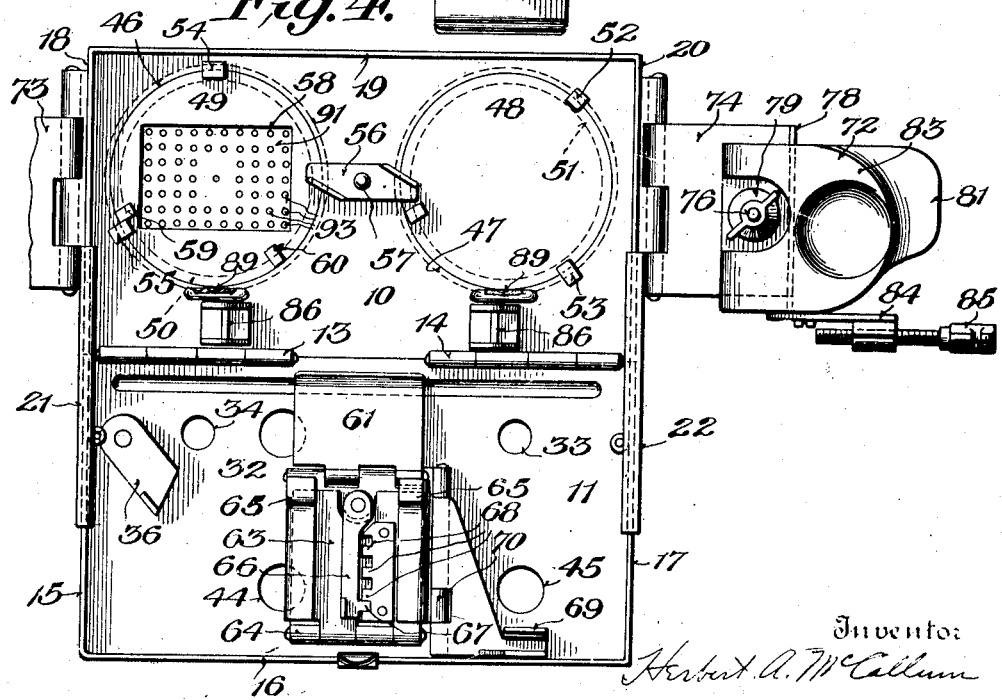

H. A. McCALLUM.
VIEW FINDER FOR CAMERAS.
APPLICATION FILED JUNE 28, 1918.
1,340,619.
Patented May 18, 1920.
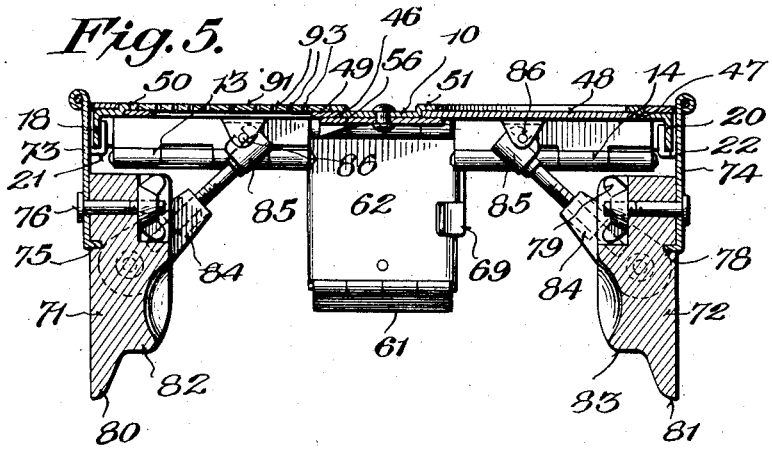
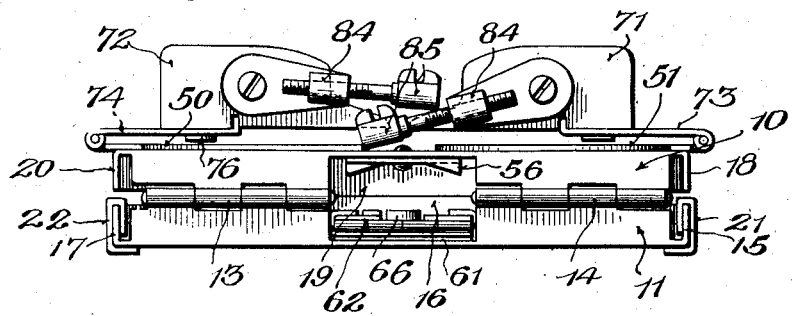
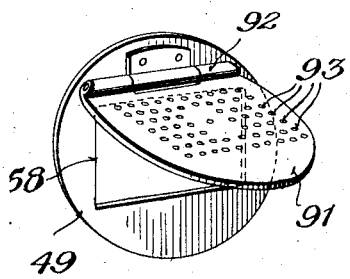
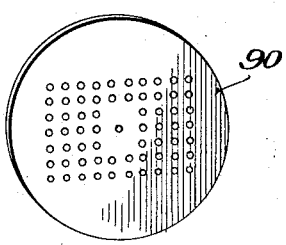
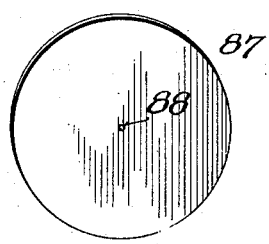

UNITED STATES PATENT OFFICE.

HERBERT A. McCALLUM, OF YONKERS, NEW YORK.

VIEW-FINDER FOR CAMERAS.

1,340,619.   Specification of Letters Patent.   Patented May 18, 1920.

Application filed June 28, 1918. Serial No. 242,407.

*To all whom it may concern:*

Be it known that I, HERBERT A. McCALLUM, a citizen of the United States, and residing at Yonkers, Westchester county, State of New York, have invented certain new and useful Improvements in View-Finders for Cameras, of which the following is a specification.

The present invention relates to cameras and more particularly to view finders therefor. In my co-pending application Number 222,856, filed March 16, 1918, I have disclosed and claimed a direct vision view finder removably secured to a camera and adapted to rest against the head of the observer so that movement of his head in seeking the desired view automatically points the camera. The present invention is directed to improvements in the construction and arrangement of the parts constituting the prior invention. The principal features of novelty reside in the novel and efficient means for securing the finder to a camera; the construction of the adjustable abutment adapted to rest against the lower part of the observer's head; the means to correct for a defect in the observer's vision; and the means whereby the finder may be adjusted for determining the view with either eye of the observer. Other objects and features of novelty will be apparent from the description taken in connection with the accompanying drawings, in which:—

Figure 1 is a rear perspective view of a finder constructed in accordance with this invention and removably secured to the rear of a camera;

Fig. 2 is a side elevation of a finder and camera showing the finder in operative position resting against the head of the observer;

Fig. 3 is a front elevation of the finder;

Fig. 4 is a rear elevation of the finder.

Fig. 5 is a sectional view taken substantially on the line 5—5 of Fig. 2;

Fig. 6 is an elevation showing the view finder in collapsed or nested position;

Fig. 7 is a perspective view of a detail;

Fig. 8 is a perspective view of a modified form of the detail shown in Fig. 7; and Fig. 9 is an elevation of a disk adapted to be used in adjusting the finder.

Referring to the drawings, the finder comprises a support consisting of two plates 10 and 11 connected for relative movement to and from each other as by the hinges 13 and 14. The plate 11 has the peripheral flanges 15, 16 and 17 on three sides thereof and the plate 10 likewise has the flanges 18, 19 and 20 on three of its sides, the arrangement being such that when the plates are opened up to the operative position as illustrated in Fig. 1 the flanges 15 and 18 are alined and also the flanges 17 and 20. In order to maintain the two plates 10 and 11 in substantially the same plane when opened up, a member 21 is slidably mounted on the flange 15 and adapted to be moved upward so that it telescopes with the flange 18 thereby forming a connector to hold the flanges in alinement with each other. A similar telescoping member 22 is slidably mounted on the flange 17 and adapted to be moved thereon and into engagement with the flange 20 above the same.

The finder may be secured to the camera for adjustment to a plurality of positions in any desired manner. Preferably as shown, the rear of the camera has a plurality of posts 23, 24, 25, 26, and 27. The flange 16 at the base thereof is formed with two apertures 28 and 29 to permit the lower edge of the plate 11 at these apertures to engage in slots 30 and 31 formed in the posts 25 and 26 respectively. The plate 11 is also formed with the circular holes 32, 33 and 34, through which the posts 24, 25 and 27 respectively project. The post 23 has a vertically extending groove 35 in one side thereof into which the edge of the plate bounding the hole 33 is moved by the pivoted finger 36 engaging the post 27 and shifting the entire plate 11 to the left as viewed in Fig. 1. The means just described secures the finder to the camera for taking pictures with the long dimension thereof horizontal. If it is desired to take pictures with the long dimension vertical, then the plate 11 is secured to the back of the camera by means of the posts 24, 37, 38 and 39. The bottom edges of the plate 11 at the apertures 28 and 29 interlock in the grooves 40 and 41 in the posts 24 and 39 respectively. The finger 36 operates on the post 38 to shift the plate 11 laterally so that the edges of the plate bounding the circular holes 33 and 34 interlock in the notches 42 and 43 in the posts 37 and 38 respectively. In this position of the view finder the posts 27 and 25 project through the holes 44 and 45 in the plate, these holes being slightly larger than the said posts.

The plate 10 is formed with two spaced circular openings 46 and 47, the centers of these openings being preferably separated a distance equal to the normal distance between the eyes of an adult person. One of these apertures is closed by a disk 48 and the other has a disk 49 mounted therein. To retain these disks in their positions the edges of the plate bounding the apertures 46 and 47 may be pressed out to form the flanges or seats 50 and 51. On the opposite side of the plate 10 the disk 48 is held in by the projections 52 and 53. The disk 49 is secured in place by similar projections 54 and 55. A member 56 is pivoted on the plate as at 57 and is adapted to be turned so that its ends overlie the disks 49 and 48, thereby, in conjunction with the said projections, securely holding the disks on their seats.

The camera with which the present finder is illustrated is adapted to take an oblong picture and in order to define the view the disk 49 is formed with an aperture 58 similar in outline to the picture taken by the camera. The disk 49 is seated on the plate 10 so that it may rotate from the position illustrated in the figures to a position in which the long dimension of the aperture is vertical. In order to properly hold the disk in either one of these two positions the disk has a stop 59 which is adapted to rest against the extension 55 when the long dimension of the aperture is horizontal. When the long dimension is vertical this stop 59 rests against the side of the projection 54. In this manner the position of the aperture is accurately determined. The function of the apertures 58 of course is to define the view to be taken by the camera, the eye of the observer being a fixed distance in rear of the plate 10. As illustrated, his view is adapted to be seen by the left eye of the observer. If it were desired to use the right eye then the disks 48 and 49 would be interchanged. Under these conditions the aperture is properly positioned with its long dimension either horizontal or vertical by a stop 60 thereon coöperating with one or the other of the projections 52 and 53. In order to hold the view finder so that the aperture in the disk 49 will be a fixed distance from one of the eyes of the observer and thereby accurately define the field of the picture, means is provided on the view finder which are adapted to rest against the head of the observer thereby maintaining the view finder in a definite position relative to the observer's head. As shown, a flap 61 is hinged to a plate 62 the latter having its lateral edges bent around a plate 63 hinged to the plate 11 as at 64. The plate 62 on its underside has the stops 65 which hold the flap 61 in the position shown in Fig. 2. The bent over edges of the plate 62 form a means for telescopically mounting the same on plate 63 so that the plate 63 with the flap 61 may be adjusted in and out relative to the camera. In order to hold the plates in adjusted position the plate 62 on its underside has a locking finger 66 provided with a tooth 67 adapted to engage in a recess between the teeth 68. The flap 61, together with the plates 62 and 63 are adapted to be turned upward from the position shown in Fig. 1 so that the plate 62 will rest against the body of the plate 11, this being the collapsed or nested position of the structure just mentioned. As clearly shown in Fig. 2 the flap 61 is designed to rest against the lower part of the observer's head, that is, the chin or the under lip. In order to hold the plates 62 and 63 at substantially right angles to the plane of the plate 11 a U-shaped member 69 is hinged at 70 to the plate 11 and is adapted to swing into a position where it embraces or straddles one edge of the said plates 62 and 63. When collapsing the device the member 69 turns on its hinge so that it lies close against the plate 11.

In order to prevent lateral movement of the finder with respect to the head of the observer and also hold the upper portion thereof in proper position, the lateral vertical edges of the plate 10 are provided with the abutments or eye pieces 71 and 72, these abutments being mounted on the hinged plates 73 and 74 respectively. The eye pieces are mounted on these plates for adjustment in a vertical direction and for this purpose the plate 73 has a flange 75 seated in a vertical groove in the side of the eye piece and a thumb screw 76 extends through the eye piece, and also a vertical slot 77 in the plate 73. Thus by loosening the clamp screw 76 the eye piece may be adjusted vertically and clamped in adjusted position by tightening up the thumb screw. The eye piece 72 is arranged for vertical adjustment in a similar manner, the flange 78 of the plate 74 engaging in a vertical groove in said piece and the thumb screw 79 being disposed to clamp the parts when adjusted. As shown, the eye abutments have the wing portions 80 and 81 respectively which are adapted to rest on the outside of the bones bordering the eye sockets, these abutments being thickened as at 82 and 83 to provide portions adapted to rest against the front edges of said bones. In order to hold these eye abutments in proper position relative to the plate 10, a plate 84 is hinged to the lower edge of each of the eye pieces and a hook 85 is threaded through the plate 84, these hooks being adapted to engage the bars 86 on the plate 11.

When carrying the camera and finder it is desirable to have the finder take up as small a space as possible and for this purpose the abutments have been hinged to the plates so that they can be nested against the same. Thus in order to collapse or nest the parts after the finder has been detached from the camera, the lower abutment is turned inward so that it rests against the plate 11. The hooks 85 are then disengaged from the bars 86 and the abutments then swung on their hinges to positions resting against the front side of the plate 10. The locking members 21 and 22 are then moved downward on the flanges 15 and 17 respectively and the plates 10 and 11 swing toward each other so that the parts occupy positions as illustrated in Fig. 6.

It is often necessary to make adjustments in the finder to adapt it for use by particular individuals. Thus if the observer's nose should contact with one of the plates 10 or 11, the lower abutment may be projected slightly and locked in this new position. If the wings 80 and 81 of the eye abutments are not properly spaced, they may be adjusted toward or from each other by turning the right hand hook 85 in its plate 84, that is, the hook associated with the eye abutment next to the imperforate disk 48. It is desirable that the abutment adjacent the view aperture be undisturbed and consequently the adjustment to properly position the wings should be made by means of the hook 85 adjacent the said imperforate disk. In operation, if it is found that the picture taken shows more or less of the view seen through the aperture 58 then another disk may be substituted with a different sized aperture, a plurality of disks being provided for this purpose. In order to determine if the center of the picture corresponds with the center of the view seen through the aperture 58 a disk 87 with a pin hole 88 therein (see Fig. 9) is substituted for the disk 49. A small object is then viewed through the hole in the disk and the camera pointed so that this object is seen as though at the center of the hole. Then the picture is taken. If the diagonals of the resulting negative intersect at the object then the finder is properly adjusted so that the center of the view seen through the aperture corresponds with the central point on the field of the camera. If, however, the object on the negative looking at the latter on the smooth side thereof is above the intersection, then the left hand eye piece as viewed in Fig. 1 should be moved upward slightly, say $\frac{1}{32}$ or $\frac{1}{16}$ of an inch. For this purpose the thumb screw 76 is loosened and the eye abutment 71 moved upward relative to the hinge plate 73 the required distance, whereupon the screw 76 is tightened. If the object is below the intersection then the eye abutment 71 should be moved downward slightly. If the object appears at the right of the intersection of the diagonals the left hand hook 85 should be turned to screw the same into the plate 84, say one turn. If the object is at the left of the intersection of the lines, then the hook should be screwed out about one turn. Of course after adjusting the left hand abutment it will be necessary to readjust the right hand eye abutment so that they will be properly spaced one with respect to the other.

In taking pictures of course it is necessary to have the camera horizontal and in order to determine this position a level 89 is mounted just below each of the disks where the bubble in one at least may be easily seen.

I have discovered, instead of using a disk 49 with a large aperture 58, a disk 90 may be preferred, said disk having a plurality of small perforations, the outer ones determining an area similar in outline to the exposure opening of the camera. This construction of view aperture has the important property of correcting for astigmatism in the eyes of the observer. Thus, if a person has astigmatism, if he uses a disk of the form illustrated in Fig. 8 he will find that he has no difficulty with his vision in seeing the view. It will be observed that the perforations are arranged in substantially vertical and horizontal rows. One of the perforations is arranged at the geometrical center of the perforated area and there are no perforations immediately adjacent this center perforation thereby providing an imperforate area. In this manner the center aperture may be used to perform the function of the aperture 88 in the disk 87. In the form of the invention illustrated in Figs. 1 to 4 inclusive, the disk 49 has the rectangular aperture 58 and a disk 91 is hinged as at 92 to the outside of the disk 49 so that it may be opened up or moved down in front of the disk 49. This outside hinged disk 91 is provided with a plurality of apertures 93 in the same way as the disk 90, these perforations when the disk 91 is down, acting in the same manner and for the same purpose as those in the disk 90. It will be seen, in this manner, an alternative construction is provided, that is, the disk 49 may be used with the unobstructed aperture 58 merely by raising the disk 91. On the other hand, if it is desired to obtain the advantages of a perforated disk, then it is merely necessary to swing down the disk 91.

In addition to the feature of correcting for the observer's vision the perforated disk has another and more important function. The ability to take time exposures with the present finder, is due in a great degree, to the riveting the sight on some part of the view near the center, while the picture is being taken. This is accomplished easily by means of the perforations in the disk, more particularly the center perforation. If the plain disk 87 with the pin hole 88 in its center were used while taking pictures, instead of the disk with the rectangular opening, it would answer the same purpose as the perforated disk, as far as the feature now being described is concerned. The purpose of the other holes in the perforated disk is to permit the eye to see all of the image to be photographed. The purpose of the imperforate area is to act as a sighting device, so that the eye can detect the slightest movement of the camera. In using the perforated disk for time exposures, one is supposed to compose the picture through all the apertures of the disk and when the exposure is made he looks steadily at the part of the view seen through the central hole, keeping that part of the view in the same relation to the central aperture, during the exposure. With a little practice exposures of two seconds can be made successfully. The limit appears to be set by the time it is possible to comfortably hold one's breath. Pressing the shutter has a tendency to cause a slight movement, so best results are obtained by holding the camera against the head with one hand and pressing the shutter by a wire release, with the other hand. It is apparent from the foregoing, that the particular arrangement of the perforations in the disk, previously described, is not necessary for the present feature. The only requirement is a single small perforation. The remainder of the view may be seen through any desired arrangement of perforations, large or small.

From the foregoing description it will be seen that a finder constructed in accordance with the present invention has no glass such as mirrors or lenses, but on the contrary the view is seen directly by the eye. Furthermore, the view finder discloses to the eye only the objects within the field of the camera so that the operator's attention is not distracted by extraneous objects. The manner of resting or positioning the finder against the head of the observer provides a steady support for the camera and time exposures even of one or more seconds' duration may be easily taken. Again, it will be observed that the movement of the operator's head in seeking the objects to be photographed automatically points the camera. The perforated area utilized for determining the view corrects for imperfections in the observer's vision and the small perforation at the center aids in holding the camera steady and this is an important feature.

It is to be understood that the embodiment of the invention described is merely illustrative and that the invention is not limited to the specific structure shown and described but includes modifications and changes which come within the scope of the appended claims.

Having thus described the invention what is claimed as new and desired to be secured by Letters Patent is:—

1. In combination with a camera, a view finder including two hinged plates adapted to swing from closed position to open position lying in substantially the same plane, means to detachably secure the lower plate to the camera, the upper plate having a view aperture similar in outline to the exposure aperture in the camera, and means on said plates constructed and arranged to bear against the observer's head to hold the plate with the aperture in fixed relation to one of the observer's eyes.

2. In combination with a camera, a view finder including two hinged plates, means to detachably secure one plate to the camera with the other plate in a plane substantially perpendicular to the line of sight, said latter plate having a view aperture similar in outline to the exposure aperture in the camera, and means constructed and arranged to bear against the observer's head to hold the plate with the aperture in fixed relation to one of the observer's eyes.

3. In combination with a camera, a view finder including two relatively movable plates adapted to be closed together to inoperative position and opened up to operative position, one plate being secured to the camera, and the other plate having a view aperture similar in outline to the exposure aperture in the camera, and means constructed and arranged to bear against the observer's head to hold the plate with the aperture in fixed relation to one of the observer's eyes.

4. In combination with a camera, a view finder including two relatively movable plates adapted to be closed together to inoperative position and opened up to operative position, one plate being secured to the camera, and the other plate having a view aperture similar in outline to the exposure aperture in the camera, and means on said plates constructed and arranged to bear against the observer's head to hold the plate with the aperture in fixed relation to one of the observer's eyes.

5. In combination with a camera, a view finder secured thereto, means constructed and arranged to bear against the observer's head to hold the view finder in fixed relation to one of the observer's eyes including a plate adapted to bear against the lower part of the observer's head, a hinged plate carrying said first plate for adjustment to and from the camera, and means for locking said first plate in adjusted position.

6. In combination with a camera, a view finder secured thereto, means constructed and arranged to bear against the observer's head to hold the view finder in fixed relation to one of the observer's eyes including a plate pivoted at the rear of the camera, means detachably coöperating with said plate to hold it substantially horizontal, a second hinged plate adapted to bear against the lower part of the observer's head mounted on said first plate for adjustment to and from the camera, and means to lock said second plate in adjusted position.

7. In combination with a camera, a view finder secured thereto, means constructed and arranged to bear against the observer's head to hold the view finder in fixed relation to one of the observer's eyes including a plate pivoted at the rear of the camera, means detachably coöperating with said plate to hold it substantially horizontal, a second hinged plate adapted to bear against the lower part of the observer's head mounted on said first plate for adjustment to and from the camera, and means to lock said second plate in adjusted position comprising teeth on one plate and a finger on the other coöperating with said teeth.

8. In combination with a camera, a view finder including a member having a plurality of perforations, the outside perforations bounding an area similar in outline to the exposure opening of the camera.

9. In combination with a camera, a view finder including a member having a plurality of perforations arranged in horizontal and vertical rows and disposed in an area similar in outline to the exposure opening of the camera.

10. In combination with a camera, a direct vision view finder including in combination a member having a plurality of perforations disposed in an area similar in outline to the exposure opening of the camera, there being a perforation at the center of said area and an imperforate area surrounding said center perforation, and means to hold the member in fixed relation to one of the observer's eyes.

11. In combination with a camera, a view finder including a plate provided with apertures and means to removably secure the plate to the camera including posts on the camera projecting through said apertures, said posts formed with slots transversely to their axes to receive the edges of the plate bounding said apertures, and means for locking said edges in said slots.

12. In combination with a camera, a view finder including two relatively movable plates, one plate being secured to the camera, and the other having a view aperture similar in outline to the exposure aperture of the camera and adapted to occupy an inoperative collapsed position next to the first plate and to be extended to operative position, means for holding the latter plate in extended position, and means on the plates to hold the aperture in fixed relation to one of the observer's eyes.

13. In combination with a camera, a view finder including a plate formed with two like circular apertures, interchangeable disks in said apertures, one disk being blank and the other having a view aperture similar in outline to the exposure opening in the camera, and means for holding the plate with the aperture in fixed relation to one of the observer's eyes.

14. In combination with a camera, a view finder including a member having a view aperture similar in outline to the exposure opening of the camera, a perforated plate hinged to turn down over said aperture, and means to hold the member with the aperture in fixed relation to one of the observer's eyes.

15. In combination with a camera, a view finder including a plate removably secured to the back of the camera, a second plate hinged to the first having a view aperture similar in outline to the exposure opening in the camera, said second plate adapted to be opened up from the first plate to a position perpendicular to the line of sight of the camera and in the same plane with the first plate, alined flanges on said plates, and a member slidably telescoped on one flange adapted to be slid onto the other flange to hold the second plate in said open position.

16. In combination with a camera, a view finder including a member formed with perforations, one perforation being relatively small and separated from the others, the perforated area of the disk being similar in outline to the exposure area of the camera.

17. In combination with a camera, a view finder including a member having a view aperture similar in outline to the exposure opening of the camera and a perforated plate removably disposed over said aperture.

18. In combination with a camera, a view finder including two hinged plates, means to detachably secure the view finder to the camera with one plate in a plane substantially perpendicular to the line of sight, said one plate having a view aperture similar in outline to the exposure aperture in the camera, and means constructed and arranged to bear against the observer's head to hold the plate with its aperture in fixed relation to one of the observer's eyes.

In testimony whereof I affix my signature.

HERBERT A. McCALLUM.